United States Patent
Li et al.

(10) Patent No.: US 10,732,632 B2
(45) Date of Patent: Aug. 4, 2020

(54) METHOD FOR GENERATING A REFERENCE LINE BY STITCHING MULTIPLE REFERENCE LINES TOGETHER USING MULTIPLE THREADS

(71) Applicant: Baidu USA LLC, Sunnyvale, CA (US)

(72) Inventors: Dong Li, Sunnyvale, CA (US); Liangliang Zhang, Sunnyvale, CA (US); Yajia Zhang, Sunnyvale, CA (US); Yifei Jiang, Sunnyvale, CA (US); Haoyang Fan, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 313 days.

(21) Appl. No.: 15/885,704

(22) Filed: Jan. 31, 2018

(65) Prior Publication Data

US 2019/0235498 A1    Aug. 1, 2019

(51) Int. Cl.

| | | |
|---|---|---|
| *G05D 1/00* | (2006.01) | |
| *G05D 1/02* | (2020.01) | |
| *B60W 30/00* | (2006.01) | |
| *G08G 1/16* | (2006.01) | |
| *B60W 10/18* | (2012.01) | |
| *B60W 10/20* | (2006.01) | |

(52) U.S. Cl.
CPC ........... *G05D 1/0088* (2013.01); *B60W 30/00* (2013.01); *G05D 1/021* (2013.01); *G05D 1/0212* (2013.01); *B60W 10/18* (2013.01); *B60W 10/20* (2013.01); *B60W 2420/42* (2013.01); *B60W 2420/52* (2013.01); *B60W 2420/54* (2013.01); *B60W 2710/18* (2013.01); *B60W 2710/20* (2013.01); *G05D 1/0246* (2013.01); *G05D 1/0255* (2013.01); *G05D 1/0257* (2013.01); *G05D 1/0278* (2013.01); *G08G 1/16* (2013.01)

(58) Field of Classification Search
None
See application file for complete search history.

(56) References Cited

U.S. PATENT DOCUMENTS

| | | | | |
|---|---|---|---|---|
| 6,092,010 A | * | 7/2000 | Alofs | G05D 1/0274 701/23 |
| 6,922,606 B1 | * | 7/2005 | Yutkowitz | G05B 19/00 318/560 |
| 8,718,932 B1 | * | 5/2014 | Pack | G01C 21/30 701/446 |

(Continued)

*Primary Examiner* — Jonathan M Dager
(74) *Attorney, Agent, or Firm* — Womble Bond Dickinson (US) LLP

(57) ABSTRACT

In one embodiment, when an ADV is driving on a trajectory generated based on a reference line, a separate processing thread is executed to precalculate a new reference line as a future reference line for a future planning cycle in parallel. The future reference line is being created while the ADV is moving along a trajectory generated based on the original reference line and before reaching a location corresponding to the starting point of the future reference line. The future reference line is overlapped with an end section of the original reference line, such that the future reference line can be connected to the end section of the original reference line. The future reference line serves an extension of the original reference line before the ADV reaches the end section of the original reference line.

22 Claims, 8 Drawing Sheets

(56) References Cited

U.S. PATENT DOCUMENTS

| | | | |
|---|---|---|---|
| 9,731,755 B1* | 8/2017 | Moshchuk | B62D 1/28 |
| 9,804,603 B1* | 10/2017 | Yegerlehner | G05D 1/0212 |
| 10,379,538 B1* | 8/2019 | Sheckells | B60W 30/10 |
| 10,551,840 B2* | 2/2020 | Zhu | G05D 1/0212 |
| 10,571,921 B2* | 2/2020 | Fan | B60W 30/095 |
| 10,591,926 B2* | 3/2020 | Fan | G05D 1/0246 |
| 2013/0304369 A1* | 11/2013 | Mathews | G09B 23/10 |
| | | | 701/400 |
| 2014/0058657 A1* | 2/2014 | Mathews | G09B 23/10 |
| | | | 701/400 |
| 2015/0197246 A1* | 7/2015 | Nagasaka | B60W 30/10 |
| | | | 701/1 |
| 2015/0353082 A1* | 12/2015 | Lee | B60W 30/09 |
| | | | 701/41 |
| 2016/0018229 A1* | 1/2016 | Lee | G01C 21/34 |
| | | | 701/409 |
| 2016/0107682 A1* | 4/2016 | Tan | B60W 30/00 |
| | | | 701/41 |
| 2016/0313735 A1* | 10/2016 | Berkemeier | G05D 1/0212 |
| 2016/0325753 A1* | 11/2016 | Stein | B60W 40/06 |
| 2017/0247054 A1* | 8/2017 | Lee | B62D 15/0295 |
| 2018/0196436 A1* | 7/2018 | Gupta | G05D 1/0212 |
| 2018/0217612 A1* | 8/2018 | Vladimerou | G05D 1/0276 |
| 2018/0348761 A1* | 12/2018 | Zhu | G08G 1/167 |
| 2019/0033871 A1* | 1/2019 | Lee | G06K 9/4604 |
| 2019/0071094 A1* | 3/2019 | Nishiguchi | G05D 1/0246 |
| 2019/0079523 A1* | 3/2019 | Zhu | G08G 1/16 |
| 2019/0079528 A1* | 3/2019 | Zhu | G01C 21/3453 |
| 2019/0235513 A1* | 8/2019 | Li | G05D 1/0212 |
| 2019/0243370 A1* | 8/2019 | Li | G05D 1/0088 |
| 2019/0359209 A1* | 11/2019 | Mizutani | B60W 30/10 |
| 2020/0042007 A1* | 2/2020 | Zhang | G05D 1/0221 |
| 2020/0049511 A1* | 2/2020 | Sithiravel | B60W 10/18 |

* cited by examiner

METHOD FOR GENERATING A REFERENCE LINE BY STITCHING MULTIPLE REFERENCE LINES TOGETHER USING MULTIPLE THREADS

TECHNICAL FIELD

Embodiments of the present disclosure relate generally to operating autonomous vehicles. More particularly, embodiments of the disclosure relate to generating reference lines for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Typically, an autonomous driving vehicle (ADV) is controlled and driven according to a reference line. When generating a driving trajectory, the system heavily relies on the reference line. The reference line is a smooth line on the map. The vehicle tries to drive by following the reference line. Roads and lanes on the map are often represented by a list of connected line segments, which are not smooth and difficult for the ADV to follow. As a result, a smooth optimization is performed on the reference line to smooth the reference line. However, such optimization is time consuming. For example, it may take 0.1 second to smooth a reference line with 100 meters (m) long. A planning cycle for planning a next trajectory is also around 0.1 second, which is not enough to complete the optimization.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
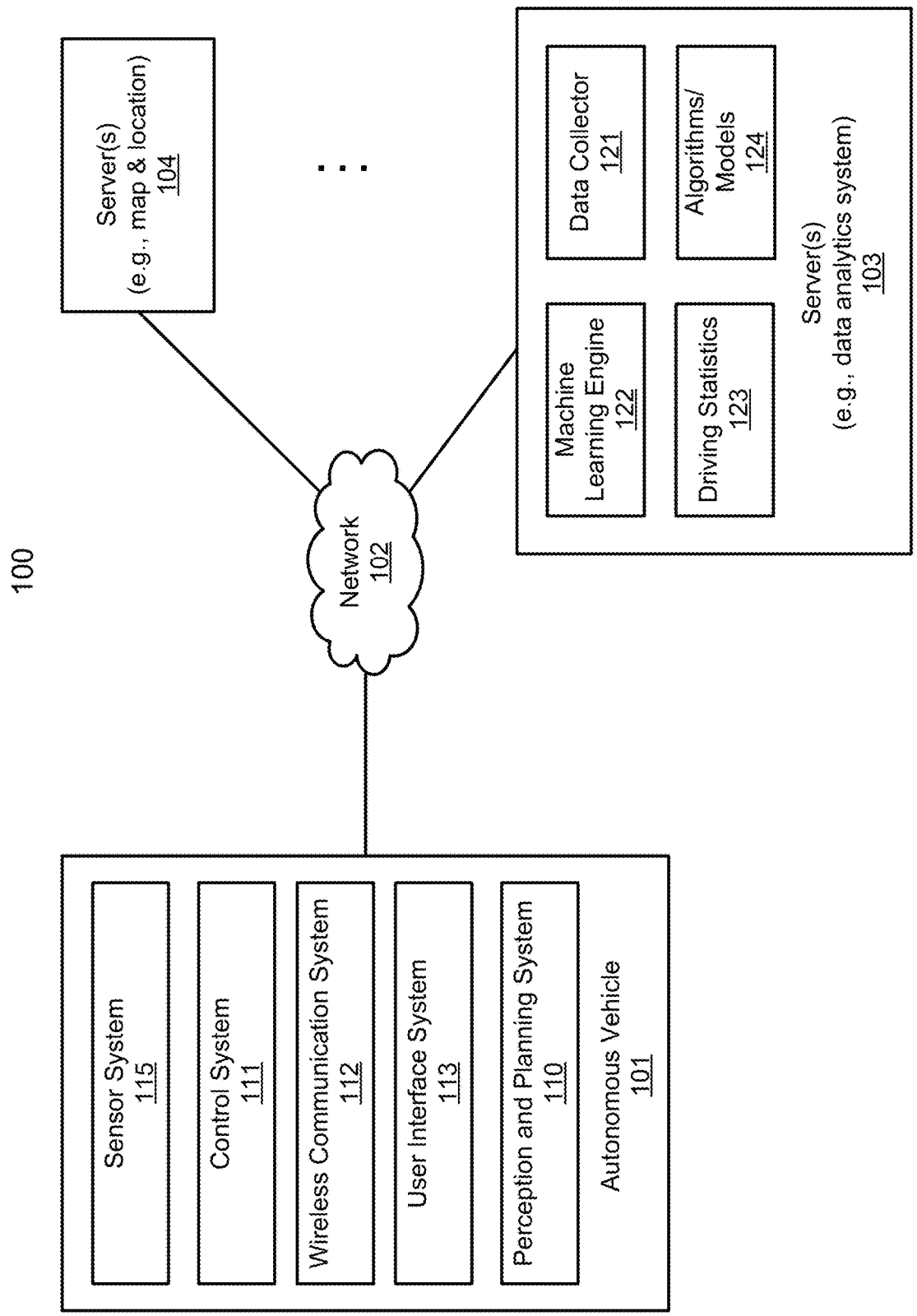
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when an ADV is driving on a trajectory generated based on a reference line associated with a road, a separate processing thread is executed to precalculate a new reference line as a future reference line for a next road segment of the road a future planning cycle in parallel. The future reference line is being created while the ADV is moving along a trajectory generated based on the original reference line and before reaching a location corresponding to the starting point of the future reference line. The future reference line is overlapped with an end section of the original reference line, such that the future reference line can be connected to the end section of the original reference line. The future reference line serves an extension of the original reference line before the ADV reaches the end section of the original reference line.

The extended portion of the reference line is created such that it smoothly connects with the end section of the original reference line. The term of "smoothly" connecting refers to at least one of the location (e.g., x, y coordinates), heading direction, the curvature, and changing rate of the curvature of the overlapped sections of the original reference line and the new reference line are substantially match or their difference is within a predetermined margin. The overlapped section of the original reference line includes at least one reference point of the end section of the original reference line, such as the last reference point of the original reference line. The above process is iteratively performed to extend the reference line in a continuous fashion, i.e., forward rolling fashion.

According to one embodiment, an ADV is controlled to move according to a first reference line associated with a road via a first processing thread. Via a second processing thread, a first set of one or more reference points within a predetermined end section of the first reference line are selected. A next road segment of the road is selected. A second set of constraint points are selected from the next road segment, which may be evenly distributed throughout the next road segment. A second reference line for the next road segment is generated based on the first set of reference points and the second set of constraint points. Generating the second reference line includes performing a smooth optimization of the second reference line using the first set of reference points and the second set of constraint points as a set of constraints. The second reference line is then connected with the first reference line within the end section of the first reference line to generate an extended first reference line. The second reference line is being generated via the second processing thread, while the ADV continues moving along the extended first reference line via the first processing thread substantially concurrently. The first and second processing threads may be executed by a single processor, different processor cores of a processor, or multiple processors.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be communicatively coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
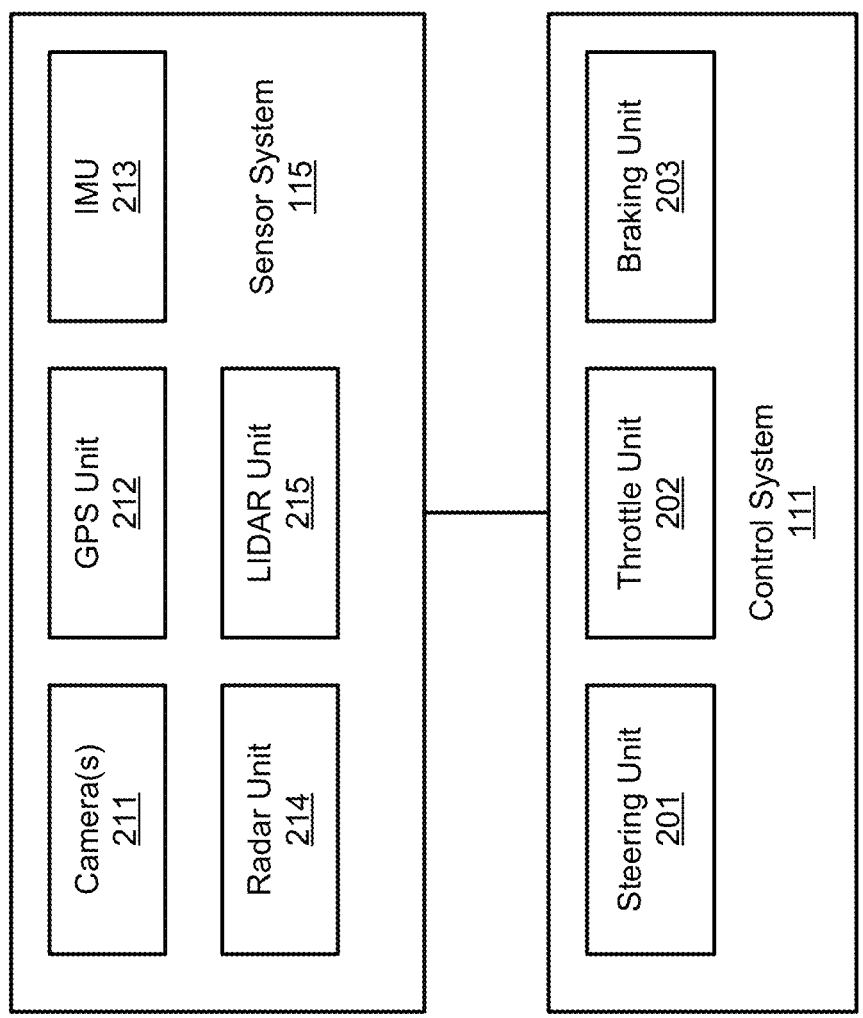
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Rules/algorithms 124 may include the rules or algorithms to calculate reference lines. In one embodiment, rules 124 may include information indicating the size of end section or tail section of an existing reference line that can be utilized as a part of new reference line. The length of the end section may be determined based on the current speed of the vehicle. The rationale behind it is that the new reference line has to be completely calculated and connected with the existing reference line before the vehicle reaches the end section. Rules 124 may further include information indicating how many reference points within the end section of the existing reference line should be selected as a part of constraints when optimizing the new reference line. Rules 124 may further include information describing a set of equality constraints and a set of inequality constraints to be utilized to perform a smoothing optimization. Such information can be compiled based on the driving history of a variety of vehicles. Rules 124 can then be uploaded into the vehicles to be utilized at real time autonomous driving, such as, for example, as a part of optimization algorithms 313 of FIG. 3A described below.

Figure 3A:
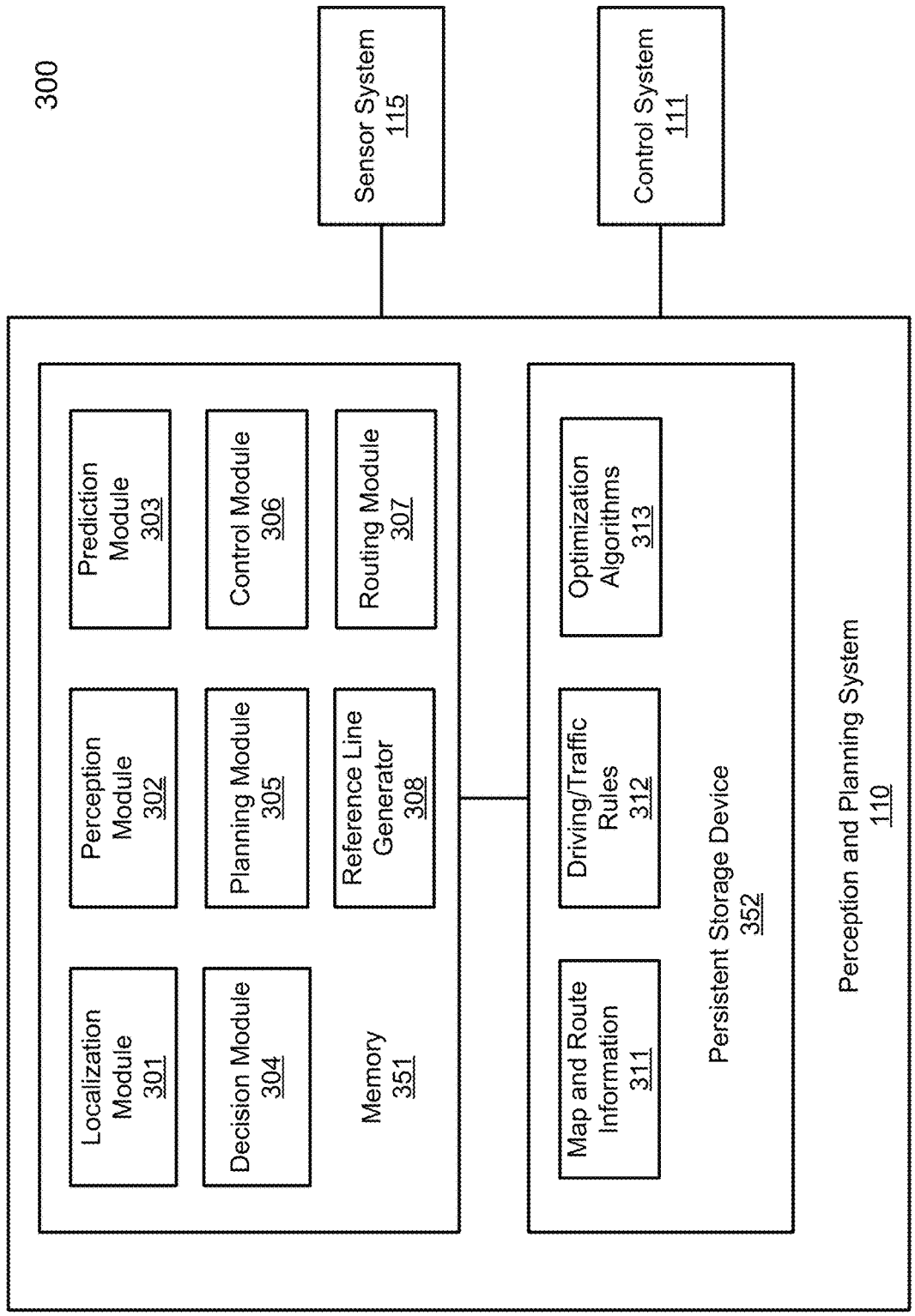
FIGS. 3A-3B are block diagrams illustrating an example of a perception and planning system used with an autonomous vehicle according to one embodiment.
Figure 3B:
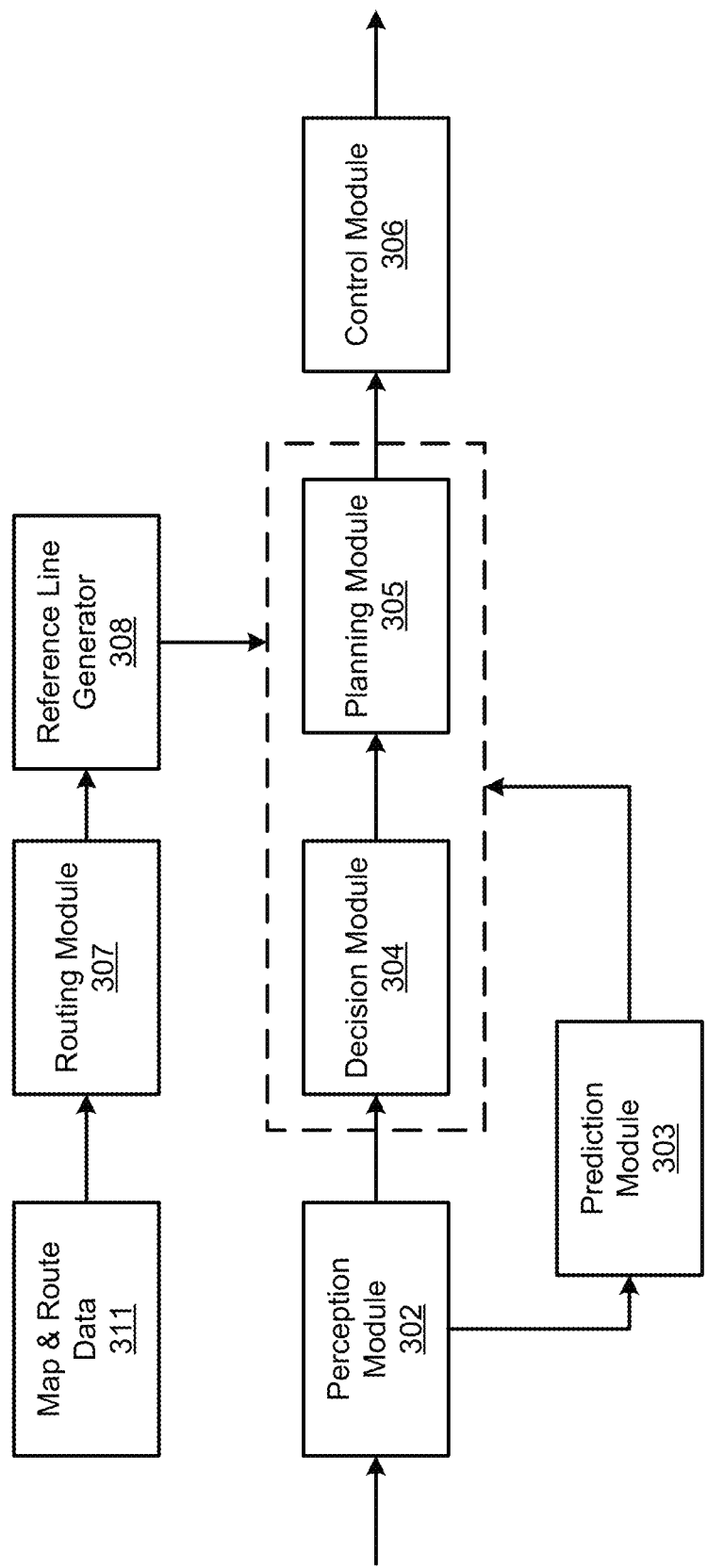

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and reference line generator or generation module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. Alternatively, a reference line may be generated by reference generator 308. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, when an initial reference line has been determined and received from routing module 307, reference line generator 308 is configured to generate a first reference line. Typically, the initial reference line was created based on the route and map information. A road is typically represented by a sequence of road segments. An initial reference line is typically the center line of each road segment. As a result, the initial reference line is a collection of center line segments connected each other and such initial reference line is not smooth, particularly at the joint of two adjacent segments. Based on the initial reference line, reference line generator 308 performs an optimization on the initial reference line to generate a smooth reference line.

In one embodiment, reference line generator 308 performs a spline optimization on the selected control points of the initial reference line. A spline is a curve represented by one or more (e.g., piecewise) polynomials joined together to form the curve. For example, a polynomial or a polynomial function can represent a segment between adjacent control points. Each control point is associated with a set of constraints, which include initial constraints, equality constraints, and inequality constraints.

The initial constraints include a set of constraints corresponding to the ADV's initial condition, e.g., ADV's immediate direction and/or geographical location. Equality constraints include a set of equality constraints asserting some equality conditions that must be satisfied. For example, the equality constraints can include a set of constraints that guarantee joint smoothness and/or some pointwise constraints are satisfied (e.g., the spline will pass some points or have some specific point heading). The inequality constraints include a set of constraints that guarantee the spline is within some boundary (e.g., less than or greater than some constraint value). Both inequality and equality constraints are hard constraints, meaning that it is required that they are satisfied. The resulting reference line will be smooth.

According to one embodiment, an initial reference line can be generated using dynamic programming techniques. Such a reference line may be referred to as a rough reference line, which is not smooth. Dynamic programming (or dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution. Once the initial or rough reference line has been generated, the initial reference line may be smoothed by an optimization process. In one embodiment, the reference line smooth optimization is performed using quadratic programming techniques. Quadratic programming involves minimizing or maximizing an objective function (e.g., a quadratic function with several variables) subject to bounds, linear equality, and/or inequality constraints. One difference between dynamic programming and quadratic programming is that quadratic programming optimizes all candidate movements for all points on the reference line at once.

However, the above optimization operations are time consuming and sometimes the time it takes to calculate and smooth a reference line is significant compared to a time duration of a planning cycle. A conventional system typically calculate a reference line one at a time. For each planning cycle, the system has to generate a reference line. Typically, a planning cycle is ranging from 0.1 to 0.2 seconds. If the time to calculate a reference line is close to 0.1 second or takes up a significant part of the planning cycle, it may not have enough time to perform other operations within the planning cycle. A reference line typically represents a path with 200 meters long. In order to ensure the system has sufficient time, conventional systems may have to limit a reference line to 70 meters long, which in turn shortens the time to calculating the reference line. However, the shorter reference line may not be long enough for planning on highways, which typically requires 200 meters. On highways, a case needs to plan for next 200 meters to anticipate sharp turns and stopped cars in front.

According to one embodiment, while the system is controlling an ADV according to a trajectory generated from a first reference line, reference line generator 308 precalculates a second reference line, for example, using some of the optimization algorithms 313, via a separate processing thread, based on a second location, i.e., a future location, on the trajectory the ADV is predicted to reach at some point. In one embodiment, the second location is located within a predetermined end section or tail section of the first reference line. The second reference line is calculated in parallel using a different thread, while the ADV is still traveling according to the trajectory and before reaching the second location. The second reference line is optimized and smoothed such that the starting point of the second reference line can be smoothly connected to the end section of the first reference line, i.e., extending the first reference line. The second reference line serves as an extension to the original or ongoing reference line. As the vehicle is traveling along the reference line, another reference line is generated and connected at the tail of the reference line, and so on. The above process is iteratively performed to keep extending the reference line using a separate processing thread. As a result, reference line generator 308 can generate a shorter reference line to extend the ongoing reference line, as long as the generation of reference line extension is ahead of the vehicle that consumes the ongoing reference line. Note that the first processing thread and the second processing thread may be executed by a single processor (e.g., time sharing fashion), different processor cores of a processor, or different processors.

Figure 4:
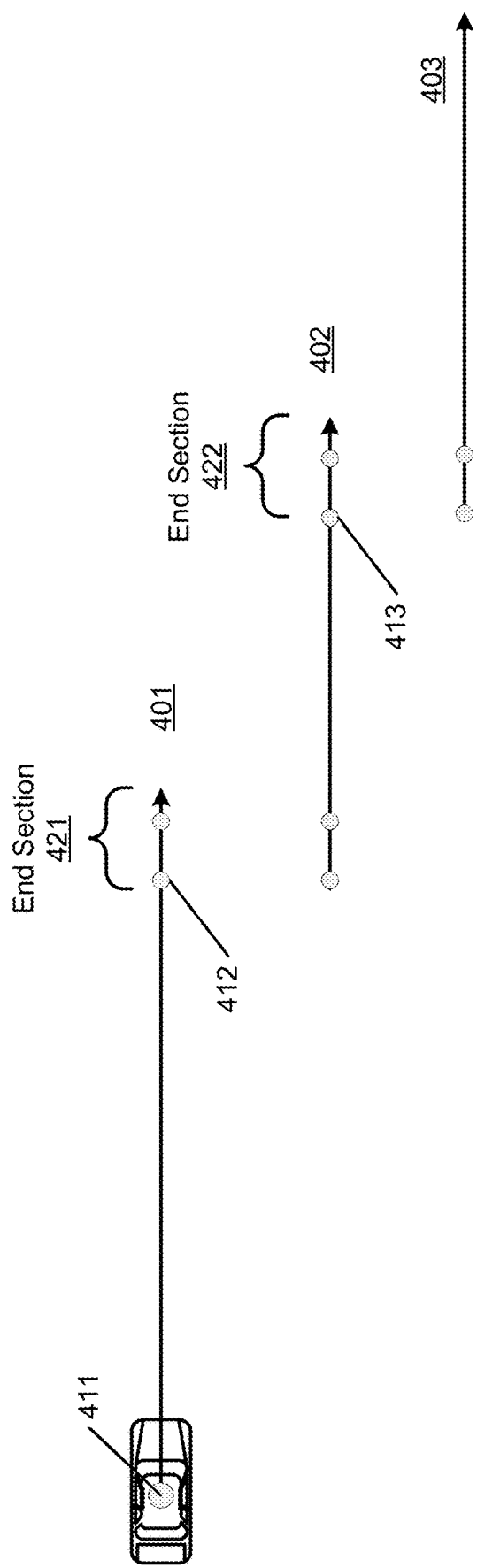
FIG. 4 is a diagram illustrating a process of generating reference lines using multiple threads according to one embodiment.

FIG. 4 is a diagram illustrating a process of generating reference lines using multiple threads according to one embodiment. Referring to FIG. 4, it is assumed the ADV is driving on a trajectory that was generated based on a first reference line 401. It is also assumed the vehicle is at a first location 411 of reference line 401 at the moment, which is planned and controlled by a first processing thread, for example, by planning module 305 and/or control module 306. At location 411, reference line generator 308 determines a second location 412 in future time with respect to location 411, for example, within a predetermined end section or tail section 421 of first reference line 401. In one embodiment, end section 421 is approximately 10% of the total length of reference line 401. Thus, if reference line 401 is 200 meters long, end section 421 would be 20 meters long.

Thus, at location 411, via a second processing thread, reference line generator 308 (or a separate instance of reference line generator 308) concurrently generates a second reference line 402 having a starting location of location 412 to cover the next road segment. Note that the first processing thread to drive the vehicle according to a trajectory generated based on the first reference line 401 is concurrently executed with respect to the second processing thread that calculates the second reference line 402. The second reference line 402 is being calculated and smoothly connected with end section 421 before the vehicle reaches location 412. By the time the vehicle reaches end section 411 of reference line 401, the vehicle will move onto second reference line 402 without having to calculate the second reference line 402 at the point in time. In addition, another reference line, in this example, reference line 403 will be generated and connected with end section 422 of the second reference line 402 via a separate processing thread. The term of smoothly connecting refers to connecting the starting section of second reference line 402 with end section 421 of first reference line 401 with the substantially identical (x, y) coordinates, substantially identical curvature, and substantially identical curvature change rate at the joint section.

Figure 5:
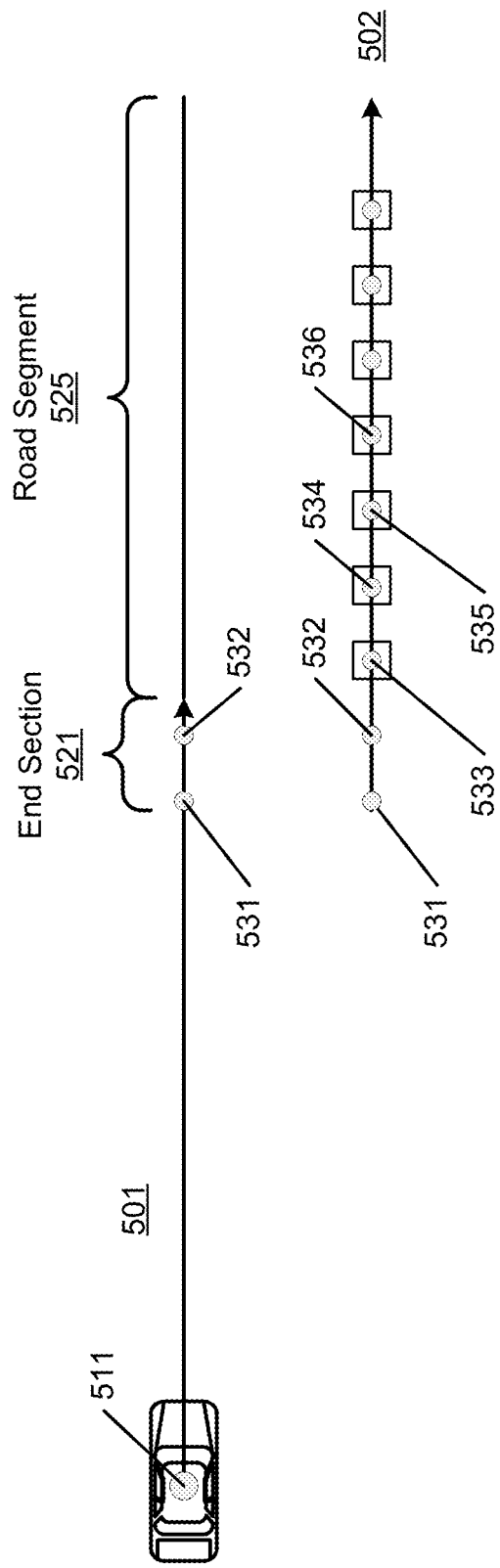
FIG. 5 is a diagram illustrating a process of generating reference lines using multiple threads according to another embodiment.

Referring now to FIG. 5, when the vehicle is at location 511, which in this example a starting location of the first reference line 501, reference line generator 308 identifies and selects a next road segment 525 that the vehicle is likely moving onto. In addition, reference line generator 308 determines end section 521 of the first reference line 501. In one embodiment, end section 521 is approximately 10% of the total length of reference line 501. From the end section 521, reference line generator 308 identifies and selects one or more reference points such as reference points 531-532. In addition, from road segment 525, reference line generator 308 determines and selects a list of constraint points such as 533-536. In one embodiment, constraint points 533-536 are selected evenly distributed along road segment 525.

In one embodiment, when generating second reference line 502, a smoothing optimization is performed, using the optimization techniques as described above. When performing the smoothing optimization, reference points 531-532 and constraint points 533-536 are utilized as a set of constraints. In one embodiment, reference points 531-532 are utilized as a set of equality constraints and constraint points 533-536 are utilized as a set of inequality constraints. That is, the reference line 502 includes significant part or substantial part of end section 521 of reference line 501, such that the starting portion or overlapped portion of reference line 502 can be smoothly connected with end section 521 of reference line 501.

Since reference points 531-532, in this example, are utilized as a set of equality constraints, the overlapped portion between reference line 501 and reference line 502 must match the (x, y) coordinates, heading direction, curvature, and/or curvature change rate of reference points 531-532. However, since constraint points 533-536 are utilized as a set of inequality constraints, during the optimization, reference line 502 is allowed to go through within certain boundaries or tolerance of constraint points 533-536, represented by surrounding boxes herein. As a result, reference line 502 can be smoothly connected with end section 521 of reference line 501, while it is flexible enough to cover the remaining portion of road segment 525 to ensure the smoothness of the remaining reference line 502. The vehicle can continue moving onto reference line 502 from reference line 501 smoothly.

Figure 6:
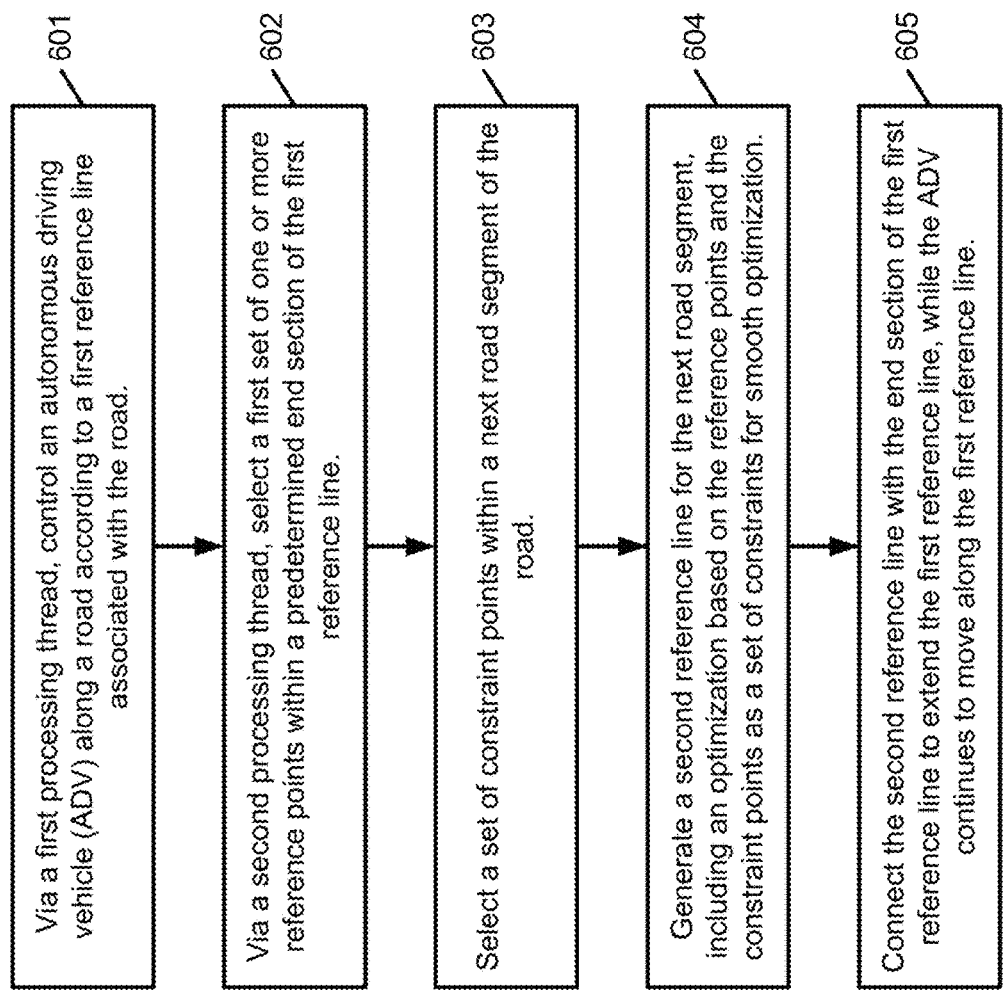
FIG. 6 is a flow diagram illustrating an example of a process for generating a reference line for autonomous driving according to one embodiment.

FIG. 6 is a flow diagram illustrating an example of a process for generating a reference line for autonomous driving according to one embodiment. Process 600 may be performed by processing logic which may include software, hardware, or a combination thereof. For example, process 600 may be performed by reference line generator 308. Referring to FIG. 6, in operation 601, via a first processing thread executed by a processor, processing logic controls an ADV along a road according to a first reference line. Via a second processing thread, in operation 602, processing logic selects a set of one or more reference points within a predetermined end section or tail section of the first reference line. In operation 603, processing logic selects a set of constraint points within a next road segment of the road. The selected constraint points are evenly distributed throughout the next road segment. In operation 604, processing logic generates a second reference line for the next road segment based on the set of reference points and the set of constraint points. The reference line generation process includes performing a smooth optimization using the selected reference points and constraint points as a set of constraints, such that the second reference line can be smoothly connected with the end section of the first reference line. In operation 605, the second reference line is connected with the end of the first reference line to generate an extended first reference line, while the ADV continues moving along the first reference line.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
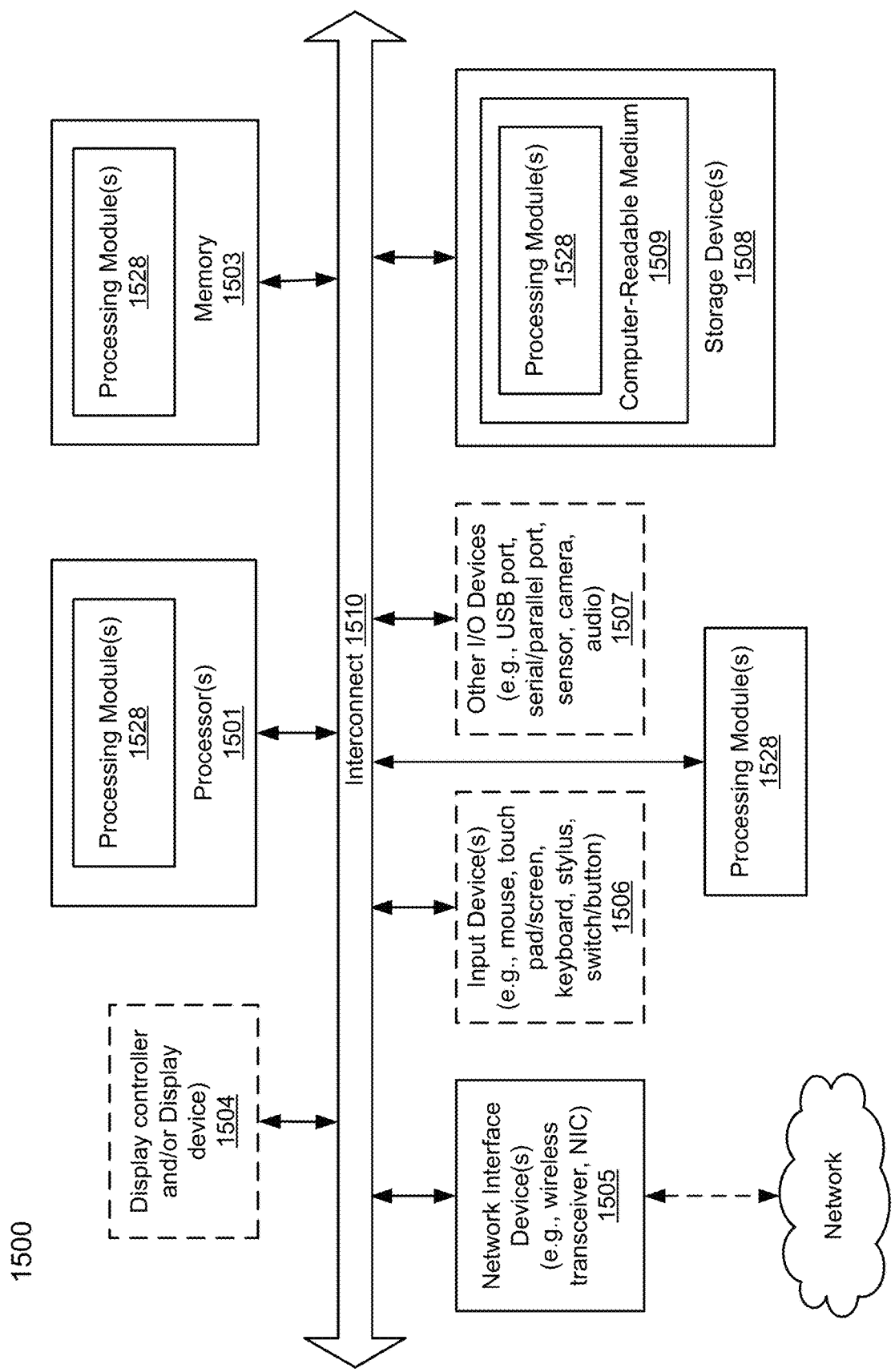
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or reference line generator 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for generating a reference line for operating an autonomous driving vehicle, the method comprising:
controlling, via a first processing thread executed by a processor, an autonomous driving vehicle along a road according to a first reference line; and
concurrently via a second processing thread,
selecting a first set of one or more reference points within a predetermined end section of the first reference line,
selecting a second set of constraint points within a next road segment of the road,
generating a second reference line for the next road segment based on the first set of one or more reference points and the second set of constraint points, including performing a smoothing optimization using the first set of reference points and the second set of constraint points as a set of constraints for the second reference line, and
connecting the second reference line with the first reference line within the predetermined end section of the first reference line to generate an extended first reference line, while the autonomous driving vehicle continues to move along the first reference line.

2. The method of claim 1, wherein the predetermined end section of the first reference line comprises approximately 10% of an entire length of the first reference line.

3. The method of claim 1, wherein the second reference line is coupled to the first reference line at an earliest reference point of the first set.

4. The method of claim 3, wherein the second reference line includes each of the reference points in the first set of the first reference line.

5. The method of claim 4, wherein the second reference line is within a predetermined distance from each of the constraint points in the second set.

6. The method of claim 1, wherein the second processing thread is launched and executed to generate the second reference line prior to the autonomous driving vehicle reaching within a predetermined proximity of the predetermined end section of the first reference line.

7. The method of claim 1, wherein the second processing thread is launched and executed at least a predetermined of time period prior to reaching the predetermined end section of the first reference line.

8. The method of claim 7, wherein the predetermined time period represents time that is required to generate the second reference line.

9. A non-transitory machine-readable medium having instructions stored therein, which when executed by a processor, cause the processor to perform operations, the operations comprising:

controlling, via a first processing thread executed by a processor, an autonomous driving vehicle along a road according to a first reference line; and
concurrently via a second processing thread,
- selecting a first set of one or more reference points within a predetermined end section of the first reference line,
- selecting a second set of constraint points within a next road segment of the road,
- generating a second reference line for the next road segment based on the first set of one or more reference points and the second set of constraint points, including performing a smoothing optimization using the first set of reference points and the second set of constraint points as a set of constraints for the second reference line, and
- connecting the second reference line with the first reference line within the predetermined end section of the first reference line to generate an extended first reference line, while the autonomous driving vehicle continues to move along the first reference line.

10. The machine-readable medium of claim 9, wherein the predetermined end section of the first reference line comprises approximately 10% of an entire length of the first reference line.

11. The machine-readable medium of claim 9, wherein the second reference line is coupled to the first reference line at an earliest reference point of the first set.

12. The method of claim 3, wherein the second reference line includes each of the reference points in the first set of the first reference line.

13. The machine-readable medium of claim 12, wherein the second reference line is within a predetermined distance from each of the constraint points in the second set.

14. The machine-readable medium of claim 9, wherein the second processing thread is launched and executed to generate the second reference line prior to the autonomous driving vehicle reaching within a predetermined proximity of the predetermined end section of the first reference line.

15. The machine-readable medium of claim 9, wherein the second processing thread is launched and executed at least a predetermined of time period prior to reaching the predetermined end section of the first reference line.

16. The machine-readable medium of claim 15, wherein the predetermined time period represents time that is required to generate the second reference line.

17. A data processing system, comprising:
a processor; and
a memory coupled to the processor to store instructions, which when executed by the processor, cause the processor to perform operations, the operations including
- controlling, via a first processing thread executed by a processor, an autonomous driving vehicle along a road according to a first reference line, and
- concurrently via a second processing thread,
  - selecting a first set of one or more reference points within a predetermined end section of the first reference line,
  - selecting a second set of constraint points within a next road segment of the road,
  - generating a second reference line for the next road segment based on the first set of one or more reference points and the second set of constraint points, including performing a smoothing optimization using the first set of reference points and the second set of constraint points as a set of constraints for the second reference line, and
  - connecting the second reference line with the first reference line within the predetermined end section of the first reference line to generate an extended first reference line, while the autonomous driving vehicle continues to move along the first reference line.

18. The system of claim 17, wherein the predetermined end section of the first reference line comprises approximately 10% of an entire length of the first reference line.

19. The system of claim 17, wherein the second reference line is coupled to the first reference line at an earliest reference point of the first set.

20. The system of claim 19, wherein the second reference line includes each of the reference points in the first set of the first reference line.

21. The system of claim 20, wherein the second reference line is within a predetermined distance from each of the constraint points in the second set.

22. The system of claim 17, wherein the second processing thread is launched and executed to generate the second reference line prior to the autonomous driving vehicle reaching within a predetermined proximity of the predetermined end section of the first reference line.

* * * * *